United States Patent
Straßer

(10) Patent No.: US 11,970,083 B2
(45) Date of Patent: Apr. 30, 2024

(54) METHOD FOR CONTROLLING THE BRAKING OPERATION OF A MOTOR VEHICLE

(71) Applicant: AUDI AG, Ingolstadt (DE)

(72) Inventor: Roman Straßer, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 791 days.

(21) Appl. No.: 17/085,179

(22) Filed: Oct. 30, 2020

(65) Prior Publication Data
US 2021/0170878 A1 Jun. 10, 2021

(30) Foreign Application Priority Data
Dec. 10, 2019 (DE) .................. 10 2019 133 676.7

(51) Int. Cl.
| | |
|---|---|
| *B60L 7/26* | (2006.01) |
| *B60L 7/10* | (2006.01) |
| *B60T 1/06* | (2006.01) |
| *B60T 8/17* | (2006.01) |
| *B60T 8/32* | (2006.01) |

(Continued)

(52) U.S. Cl.
CPC ............. *B60L 7/26* (2013.01); *B60L 7/10* (2013.01); *B60T 1/065* (2013.01); *B60T 8/17* (2013.01); *B60T 8/321* (2013.01); *B60T 13/586* (2013.01); *B60T 13/746* (2013.01); *B60T 2250/00* (2013.01); *B60T 2270/604* (2013.01)

(58) Field of Classification Search
CPC ....................................................... B60K 7/26
See application file for complete search history.

(56) References Cited

U.S. PATENT DOCUMENTS

| | | | |
|---|---|---|---|
| 2004/0108770 A1* | 6/2004 | Maki .................. | B60L 7/26 303/116.4 |
| 2007/0272457 A1* | 11/2007 | Kodama .............. | B60K 6/52 903/947 |

(Continued)

FOREIGN PATENT DOCUMENTS

| | | |
|---|---|---|
| CN | 1704275 A | 12/2005 |
| CN | 103140395 A | 6/2013 |

(Continued)

OTHER PUBLICATIONS

German Examination Report dated Sep. 29, 2021, in connection with corresponding DE Application No. 10 2019 133 676.7 (12 pp., including machine-generated English translation).

(Continued)

*Primary Examiner* — Jean Paul Cass
(74) *Attorney, Agent, or Firm* — Maier & Maier, PLLC

(57) ABSTRACT

A method for controlling the braking operation of a motor vehicle including at least one electric drive machine, which is switchable into a generator mode effectuating a deceleration of the motor vehicle, as well as a friction braking device having multiple friction brakes, each assigned to a wheel, having brake elements, which are movable toward a brake disc via an actuator. A first braking is performed using the drive machine switched into the generator mode until a first threshold value of the regenerative power or deceleration is reached, after which additionally required braking power is provided by the friction braking device, which is also actuated upon reaching the threshold value.

8 Claims, 2 Drawing Sheets

(51) Int. Cl.
*B60T 13/58* (2006.01)
*B60T 13/74* (2006.01)

(56) References Cited

U.S. PATENT DOCUMENTS

| | | | |
|---|---|---|---|
| 2007/0284937 A1* | 12/2007 | Deiml | B60W 20/00 |
| | | | 303/115.3 |
| 2016/0129809 A1* | 5/2016 | Umayahara | B60W 30/18127 |
| | | | 701/22 |
| 2016/0159225 A1* | 6/2016 | Nakatsu | B60L 15/2009 |
| | | | 701/70 |
| 2019/0193572 A1 | 6/2019 | Nakata et al. | |
| 2019/0299806 A1* | 10/2019 | Oyama | H01M 10/425 |
| 2019/0299807 A1* | 10/2019 | Oyama | B60K 23/08 |
| 2020/0086875 A1* | 3/2020 | Hoffmann | B60W 30/18127 |

FOREIGN PATENT DOCUMENTS

| | | |
|---|---|---|
| CN | 106256624 A | 12/2016 |
| CN | 107921878 A | 4/2018 |
| CN | 109383467 A | 2/2019 |
| DE | 10356085 A1 | 7/2004 |
| DE | 10 2012 021 057 A1 | 4/2014 |
| DE | 10 2013 218 127 A1 | 3/2015 |
| DE | 10 2013 205 314 B4 | 9/2016 |
| DE | 112017004533 T5 | 5/2019 |

OTHER PUBLICATIONS

Office Action dated Sep. 8, 2023, in corresponding Chinese Application No. 202011425656.X, 14 pages.

Office Action issued on Jan. 5, 2024, in corresponding Chinese Application No. 202011425656.X, 14 pages.

* cited by examiner

METHOD FOR CONTROLLING THE BRAKING OPERATION OF A MOTOR VEHICLE

FIELD

The disclosure relates to a method for controlling the braking operation of a motor vehicle comprising at least one electric drive machine, which is switchable into a generator mode effectuating a deceleration of the motor vehicle, and a friction braking device having multiple friction brakes, each assigned to a wheel, having braking elements, which are movable toward a brake disc via an actuating means, wherein in case of braking, firstly braking is performed using the drive machine switched into the generator mode until reaching a first threshold value of the regenerative power or deceleration, after which additionally required braking power is provided by the friction braking device, which is also actuated upon reaching the threshold value.

BACKGROUND

Modern motor vehicles having an electric drive machine, i.e. an electric motor, which is fed from a correspondingly dimensioned battery, also offer the option, in addition to the option of solely electrical operation, of braking the vehicle via the electric drive machine and regenerating energy at the same time, which is fed into the battery to charge it. For this purpose, for example when a braking intention has been detected by detecting a brake pedal actuation, or when a situation requiring deceleration has been detected in case of a (partially) autonomous driving mode, the drive machine is switched into a generator mode, in which the electric machine thus no longer operates as a motor, but rather as a generator, which is driven via the kinetic energy of the vehicle. The degree of the deceleration can be varied depending on the incorporated generator power, but accompanying this also the regenerative power, i.e., the amount of current which can be generated and fed into the battery. This generator or regenerative braking is only used up to a certain threshold value for the regenerative power or deceleration, which is significantly below the maximum technical regenerative power or deceleration. Any deceleration going beyond this is provided by the friction braking device and in addition to the provision of this additional braking device, of course, it also functions as a second, active braking system, which can take over the actual braking operation in an emergency.

In normal operation, the braking operation takes place in such a way that firstly, with moderate braking, braking is carried out exclusively via the drive machine switched to the generator mode. Only when the degree of deceleration or the regenerative power of the drive machine reaches the first threshold value is the additionally required braking power provided via the friction braking device, which is then additionally switched on in parallel. This is referred to as so-called "brake blending", because in this case both braking devices are activated and the friction braking device is also braked increasingly strongly upon reaching the first threshold value with increasing braking power.

The first threshold value of the regenerative power or deceleration, up to which regenerative braking takes place, cannot be set too high, however, since if the regenerative brake fails before this first threshold value is reached, the friction brake is not active and a certain, albeit short time is required until the friction brake can completely replace the failed regenerative brake, i.e. it can take over the braking operation. This is because a certain amount of time is required to activate the friction braking device accordingly, i.e. for example in the case of an electro-hydraulically operating friction braking device, to build up the brake fluid pressure and to move the brake elements toward the rotating brake discs, or in case of an electromechanical braking device to activate the electrical actuating elements, i.e., the electric motors accordingly, so that they move the brake elements toward the brake discs and effectuate the same deceleration as the failed regenerative braking device beforehand. This time delay can result in a dangerous situation, since no or only a greatly reduced braking power is available within this takeover time interval. This threshold value, which is set relatively low for safety reasons, now has the result that the regeneration potential is only partially exhausted, as regenerative braking can only be performed down to a lower maximum regenerative power, although the electrical system or the regenerative brake would permit significantly more, and additionally required braking power is exclusively provided from then in solely mechanical ways via the friction braking device. The technically possible maximum regenerative power of the electric drive machine is thus not utilized or is only used up to a certain threshold value of the regenerative power or deceleration, which is significantly below the maximum technical regenerative power or deceleration.

SUMMARY

The disclosure is therefore based on the object of specifying a method which is improved in comparison for controlling the braking operation of an electrically driven motor vehicle.

To solve this problem, it is provided according to the disclosure in a method of the type mentioned at the outset that the friction braking device is already activated upon reaching a second threshold value of the regenerative power or the deceleration, which is lower than the first threshold value, in such a way that the brake elements are moved toward the brake discs, wherein this state is maintained until reaching the first threshold value.

According to the disclosure, a second threshold value, which is lower in comparison to the first threshold value, is provided, which defines from when the friction braking device is already activated and is quasi-"pre-tensioned". If the regenerative power or the generator power, respectively, is successively increased during a braking process, also corresponding to the deceleration, of course, a "pre-tension" of the friction braking device is thus not necessary until reaching the second threshold value, since the deceleration is relatively minor and an immediate takeover by the friction brake is possible even in the event of a failure of the regenerative brake. The friction braking device is only activated accordingly via a corresponding control unit when the second threshold value is reached, so that the brake elements are already moved toward or in the direction of the brake discs from this early time, therefore the friction braking device is moved into a prepared state in which it does not also actively brake, and thus does not generate relevant braking torque. This state, thus this position of the braking elements, is maintained even if the regenerative power or generator power and thus the deceleration is increased again, therefore the braking is increasingly stronger. Only when the first threshold value is reached, up to which the regenerative power or generator power can be increased at most, does the pre-tensioned friction braking device take over the additional braking power, that is to say the brake elements are now pressed with corresponding pressure against the brake discs, to decelerate the vehicle in addition to the now constant regenerative deceleration.

However, if the regenerative brake fails after the second threshold value has been exceeded, the friction braking device can thus immediately take over the braking operation, since it is already prepared or "pre-tensioned" as stated, i.e. the brake elements have already been moved into a takeover position relative to the brake discs, so that now the full braking power required from the regenerative brake failure is only made available by increasing the brake pressure or positioning movement of the servomotors, which can be achieved quickly or directly, respectively. The takeover of the complete braking operation solely by the friction braking device in the interval between the second threshold value and the first threshold value therefore takes place extremely quickly and more or less without noticeable delay, since the friction braking device is already prepared or "pre-tensioned".

This circumstance now opens up the option of setting the first threshold value significantly higher than previously possible. This is because due to the possibility of (nearly) instantaneous takeover of the full braking operation by the friction braking device in case of a failure of the regenerative brake, the complete braking operation can also be ensured even if braking is performed using relatively high regenerative power or generator power, i.e., with a very strong deceleration, since the friction braking device can provide the full braking power in case of problems with almost no time delay. The fact that it is now possible to work with a significantly higher maximum regenerative power or generator power within the method according to the disclosure therefore necessarily has the result that the regenerative potential can be exhausted significantly more, therefore significantly more power can be generated in the scope of the regenerative braking operation and accordingly fed into the battery or supplied to other consumers, which therefore makes the reclamation significantly more efficient than previously typical. This means that braking operation significantly more efficient with respect to the regenerative potential is provided, while simultaneously ensuring an extremely high safety standard due to the pre-tensioned friction braking device according to the disclosure for the immediate, complete takeover of the braking operation in case of problems.

Of course, it is possible to assign such a disc brake to each of the wheels of all axles, i.e., in a passenger automobile the two axles, and to activate them accordingly if necessary. However, it is also conceivable to assign disc brakes only to the wheels of one axle, in particular the front axle, and to provide drum brakes on the other axle.

The second threshold values are to be, for example, in the interval between 10-40% of the maximum regenerative power or between, for example, 0.1-0.4 g deceleration. It is expedient to set the second threshold value rather lower in order to bring the friction braking device into the prepared state already at a relatively early time. The second threshold value can preferably be between 15-35% of the maximum regenerative power, in particular between 20-30% of the maximum regenerative power, or preferably between 0.15-0.35 g deceleration, in particular between 0.2-0.3 g deceleration. The percentage values of the regenerative power relate to the maximum technically possible regenerative power as the reference base. The values are generally only exemplary and not restrictive. The specific threshold value can be determined as a function of the electrical characteristic values or power values of the drive machine. The time at which the pre-tensioning process is initiated can be determined, for example, as a function of the braking behavior of the driver, so that for example in the case of a driver who brakes sportily, i.e. quickly and with strong deceleration, the activation already takes place shortly before reaching a target value of the regenerative power or deceleration at which the pre-tensioning process is to be completed, so that it is ensured that the friction braking device is pre-tensioned upon reaching the target value. That is to say, the second threshold value is variable, for example within a value interval, and is adaptable, for example to the driver behavior.

Two different variants are conceivable in the context of "pre-tensioning" the friction braking device. On the one hand, only the distance of the brake elements to the brake disc can be reduced upon reaching the second threshold value in the context of the movement of the brake elements. The brake elements, i.e. the brake pads, are slightly spaced apart from the brake disc. This path is to be bridged in the context of switching on the friction braking device, in order to bring the brake elements into friction contact with the rotating brake disc. According to the described variant of the disclosure, this distance can be reduced in the context of the pre-tensioning or preparation of the friction braking device, so that in case of takeover, there is only a significantly lesser movement path. Alternatively thereto, of course, it is conceivable to already move the brake elements into slight friction contact on the brake discs in the scope of the pre-tensioning or preparation. This means that in the interval between the second and the first threshold value, the brake elements are already in slight friction or grinding contact with the brake disc, wherein an actual braking torque is not hereby generated. Rather, this only ensures that ultimately the entire movement path of the brake elements is provided and only the corresponding setting of the required brake element pressure is still required in the scope of the complete takeover in case of problem, but no longer active distance positioning.

Either an electro-hydraulically operating braking device having an actuating means in the form of a brake fluid can be provided as the friction braking device, wherein the pressure of the brake fluid is increased to move the brake elements upon reaching the second threshold value. The corresponding control unit is thus configured to increase the brake fluid pressure accordingly in the scope of the "pre-tensioning".

Alternatively, an electro-mechanical braking device having electrical actuating elements for moving the brake elements can also be provided, wherein the actuating elements are activated accordingly upon reaching the second threshold value to move the brake elements. Actuating elements in the form of suitable small electric motors are thus used here, which effectuate the movement of the brake elements. These electric motors are then activated accordingly via the control unit to move the brake elements by the desired amount.

In addition to the method itself, the disclosure furthermore relates to a motor vehicle, comprising at least one electric drive machine, which is switchable into a generator mode effectuating a deceleration of the motor vehicle, and a friction braking device having multiple friction brakes, each assigned to one wheel, having brake elements, which are movable via an actuating means toward a brake disc, wherein in case of braking, firstly braking is performed using the drive machine switched into the generator mode until reaching a first threshold value of the regenerative power or deceleration, after which additionally required braking power is provided by the friction braking device, which is also actuated upon reaching the threshold value. The motor vehicle is designed to carry out the method of the above-described type.

Of course, it is possible to assign such a disc brake to each of the wheels of all axles, i.e., in a passenger automobile the two axles, and to activate them accordingly if necessary. However, it is also conceivable to assign disc brakes only to the wheels of one axle, in particular the front axle, and to provide drum brakes on the other axle.

In particular, the friction braking device comprises at least one control unit, which is designed to control the friction brakes as a function of the regenerative power or the deceleration, and is thus capable of carrying out the corresponding control of the friction braking device as a function of the two control values. Of course, all corresponding control or regulating parameters on which the control or regulation is based are provided to the control unit, i.e. in particular the instantaneous degree of the regenerative braking, i.e. the instantaneous regenerative power or generator power, based on which actual regenerative power or generator power it is checked to what extent the second threshold value is reached and therefore the first threshold value is reached in order to activate the friction braking device accordingly depending on the given situation. Corresponding values for the actual deceleration are comparably provided in the control unit, based on which the corresponding threshold value comparison takes place if the basis of control or regulation is the deceleration.

The motor vehicle or the control unit of the friction braking device, respectively, can furthermore be embodied or designed in such a way that it controls the actuating operation of the brake elements in such a way that upon reaching the second threshold value, they are only moved to reduce the distance to the brake disc without coming into contact with the brake disc. Alternatively, the control unit can also be designed to control the actuating operation so that the brake elements are already brought into slight friction contact with the brake disc. The generation of a noticeable braking torque is not linked thereto, but rather solely coming into contact, which is advantageous, however, for even faster takeover of the complete braking operation in case of failure of the regenerative braking device.

An electro-hydraulically operating friction braking device having an actuating means in the form of a brake fluid can be provided as the friction braking device, wherein the control unit is designed to increase the pressure of the brake fluid upon reaching the second threshold value. Alternatively, an electro-mechanical braking device having electrical actuating elements for moving the brake elements can also be provided, wherein the control unit is designed to activate the actuating elements upon reaching the second threshold value.

The second threshold value is to be between 10-40%, in particular 15-35 and preferably 20-30% of the maximum generator or regenerative power, or alternatively between 0.1-0.4 g deceleration, preferably 0.15-0.35 g deceleration, and in particular 0.2-0.3 g deceleration. The values are only exemplary and not restrictive.

BRIEF DESCRIPTION OF THE FIGURES

Further advantages and details of the present disclosure will be apparent from the exemplary embodiments described below and in reference to the drawings. In the figures.

DETAILED DESCRIPTION

Figure 1:
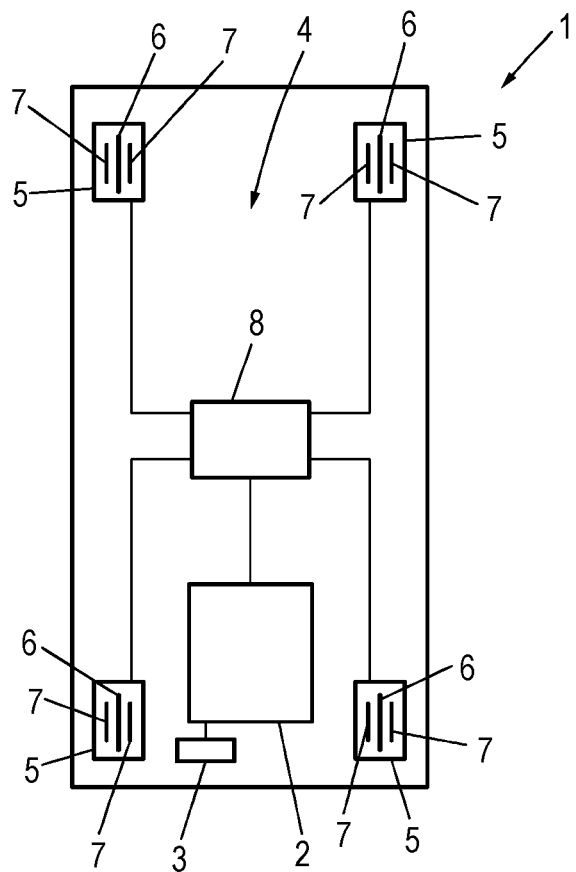
FIG. 1 shows a schematic illustration of a motor vehicle according to the disclosure.

FIG. 1 shows a motor vehicle according to the disclosure, which is designed to carry out the method according to the disclosure. It comprises an electric drive machine 2, that is to say an electric motor, which is fed from a battery 3. In addition to the motor mode that drives the vehicle, this drive machine 2 can also be switched into a generator mode used to brake or decelerate the motor vehicle, in the context of which the drive machine 2 produces current, which is fed into the battery 3, for example, to charge it. The motor vehicle 1 can therefore be decelerated in a regenerative way and the current obtained can be fed back.

Furthermore, a friction braking device 4 is provided, comprising four friction brakes 5 assigned to the individual wheels, each comprising a brake disc 6 and brake elements 7 assigned thereto, which are movable via an actuating means (not shown in greater detail) toward the rotating brake disc 6 connected to the wheel for active braking. The friction braking device 4 can operate electro-hydraulically, that is to say that a corresponding brake fluid is provided as the braking means, which is put under corresponding pressure in order to move the brake elements 7. Alternatively, it can also be an electrical-mechanical friction braking device 4, that is to say corresponding electric motors are provided as actuating means which move the respective brake elements 7.

Independently of how the friction braking device 4 is designed, it comprises at least one control unit 8 which controls the operation of the friction braking device 4. For example, the generation of the corresponding brake pressure can be incorporated or the corresponding electric motors can be activated, etc. via the control unit. Such a motor vehicle usually has a brake pedal, the position of which can be detected, wherein the control of the friction braking device 4 can take place, for example, as a function of the brake pedal position, the braking force, the brake pressure, or the like.

The friction braking device 4 is a second, active brake system, which is provided in addition to the generator brake system, implemented via the drive machine 2 switchable to generator mode. The friction braking device 4 is used, on the one hand, to assist the regenerative brake 2 during stronger braking processes or to provide the additional braking power required. On the other hand, it is also used as an emergency system, via which the entire braking operation can take place, should a problem arise within the regenerative braking system for whatever reason, for example a failure of the drive machine 2.

The control unit 8 is now able to bring the friction brakes 5 into different operating states within the friction braking device 4, specifically depending on how the currently running regenerative braking operation takes place. Because as described, of course, the attempt is primarily only to use regenerative braking to be able to exhaust the energy generation potential of this braking system and thus to ensure efficient vehicle operation. However, there are limits to this regenerative braking system up to where it can be operated, wherein the friction braking device 4 is then additionally activated.

Figure 2:
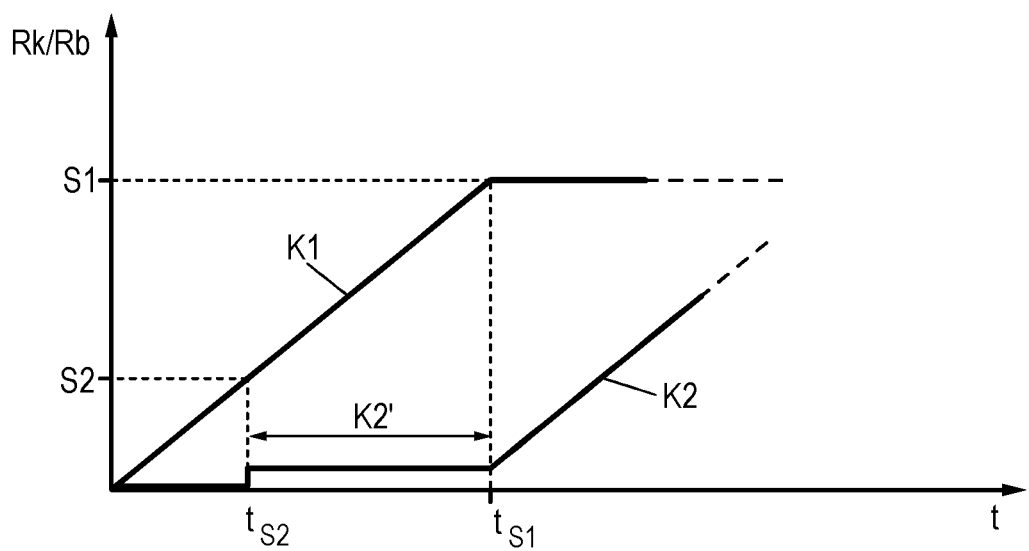
FIG. 2 shows a schematic illustration of a properly running braking process in the form of a diagram.

FIG. 2 shows, in the form of a solely schematic diagram, the basic mode of operation of the motor vehicle according to the disclosure or the method according to the disclosure.

Along the ordinate, the regenerative power Rk, that is to say the braking or generator power that is supplied via the drive machine 2 switched into generator mode, is plotted very generally, without any measured value to be assigned. In addition, the friction braking power Rb is plotted, that is to say the power which the friction braking device 4 provides. The time is plotted along the ordinate, also without a measured value.

Basically, the regenerative braking occurs only up to a predetermined, first threshold value S1 for the regenerative power. If the brake pedal is thus actuated, if it is thus assumed that increasingly stronger braking is required, the regenerative braking power thus rises increasingly strongly with increasing duration of the braking process, up to the maximum permissible first threshold value S1, from which the regenerative power or generator power can no longer be increased. From this time on, the additional braking power which is required as the brake pedal is depressed further is provided by the friction braking device 4, that is to say in addition to the regenerative brake, the friction brake now also effectuates the increasingly stronger overall deceleration. In the diagram according to FIG. 2, this is shown on the basis of the curve K1, which represents the curve of the regenerative power, and the curve K2, which shows the curve of the friction braking power. It can be seen that the curve K1 firstly rises (linearly in the example shown, but this does not necessarily have to be the case), until it reaches the first threshold value S1 at the time $t_{S1}$ and then extends constantly from then on, i.e. the regenerative power does not increase further. In return, when the first threshold value S1 is reached at time $t_{S1}$, the friction braking power obviously increases, which is additive to the regenerative power that is then constant.

FIG. 2 furthermore shows a specific curve profile with respect to the curve K2, which indicates that the friction braking device 4 is not in an entirely inactive state up to the time $t_{S1}$. Rather, the friction braking device 4 is prepared for a possible complete braking takeover, as will be described below with reference to FIG. 3.

A second threshold value S2 with respect to the regenerative power, i.e. the curve K1, is shown in the diagram according to FIG. 2. It is obvious that the second threshold value S2 is significantly lower than the first threshold value S1. If the regenerative power increases in the scope of the braking process, the friction braking device 4 is thus also activated when the second threshold value S2 is reached, in such a way that the friction brakes 5 are activated or thus either the brake fluid pressure is somewhat increased or the actuating motors are activated accordingly via the control unit 8, so that the brake elements 7 are moved into minimal friction contact, i.e. friction engagement, with the brake discs 6. This takes place at time $t_{S2}$ and is shown in the small jump in the curve branch K2' in the curve K2, wherein this jump is shown exaggeratedly large here, since actually active generation of a friction braking torque is not linked to merely bringing the brake elements 7 into contact with the brake discs 6, i.e. no friction braking power is linked thereto. Rather, this exclusively involves "pre-tensioning" or "preparing" the friction braking device 4 with respect to a possible complete takeover of the braking operation in the event of failure of the regenerative brake, as will be described below. This means that the jump in the curve K2 at time $t_{S2}$ is shown exaggerated and is only intended to illustrate that there is an active activation of the friction braking device 4 in order to "pre-tension" it and only to bring the brake elements 7 into contact with the brake discs 6 in this case. This state assumed in the curve branch K2' is maintained with the continued braking process until the first threshold value S1 is reached and thus until time $t_{S1}$. Since the friction braking device 4 has to supply the additional braking contribution from this state in any case, the additional braking power is supplied via the friction braking device 4 from this time, see the profile of the curve K2.

Figure 3:
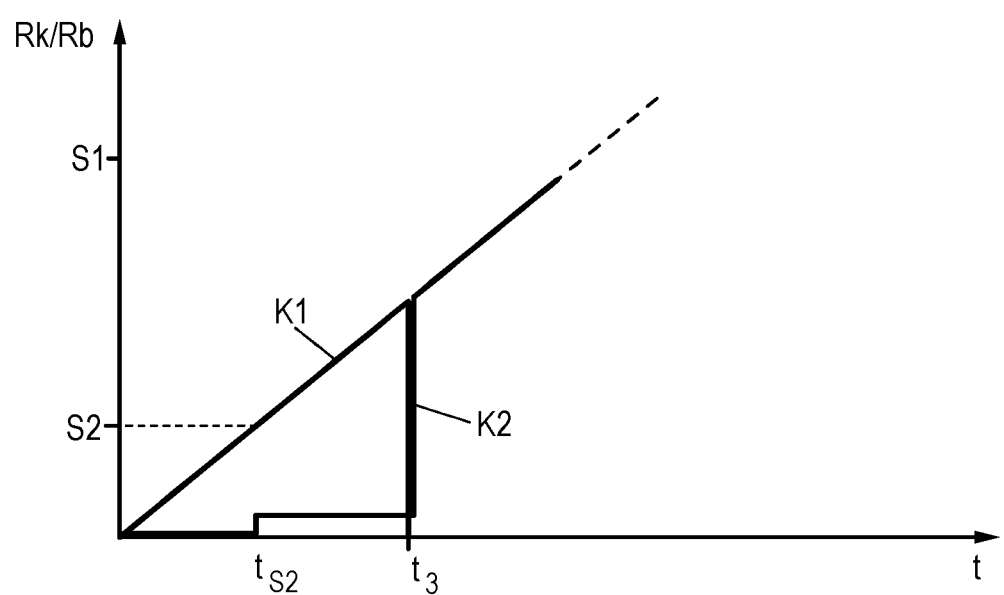
FIG. 3 shows a schematic illustration of a faulty braking process in the form of a diagram.

Starting from the correct basic functionality, as described with reference to FIG. 2, FIG. 3 shows a curve profile as results in the event of a failure of the regenerative brake via the drive machine 2. It is assumed that an initially regular braking process is also initiated here. The curve K1 of the regenerative power of the drive machine 2 clearly rises again. When the second threshold value is reached, the friction braking device 4 is again pre-tensioned, and the jump (also again shown exaggerated here) occurs at time $t_{S2}$ on the part of the curve K2 of the friction braking power, the brake elements are pre-tensioned back into contact or minor friction contact with the brake discs 6. With increasing braking process and rising regenerative power and thus stronger and stronger braking, however, at time $t_3$, a total failure of the regenerative brake occurs, which means that the drive device 2 can no longer actively brake. Immediately accompanying this or with an extremely minimal time delay, however, the friction braking device 4 takes over the complete braking operation, which means that the friction braking power is suddenly increased strongly in order to be able to completely compensate for the regenerative braking power which has dropped to zero, and also to provide a continuously rising braking power. This can be seen in the profile of the curve K2, which shows a sharp jump immediately after the time $t_3$, to ultimately quasi-continue the curve K1 with respect to the total braking power.

What is essential here is that there is only a negligible, if any, time delay in providing the full braking torque or full braking power via the friction braking device 4 after the regenerative brake fails, i.e. the extreme jump in curve K2 only takes place with a minimal delay from the extreme drop of the curve K1 or the two processes only take place delayed from one another in the millisecond range. This is because the fact that the brake elements 7 are already brought into grinding contact application, although minor, with the brake discs 6, enables the control unit 8 to activate the friction brakes 5 immediately after the time $_3$and thus the failure of the regenerative brake in such a way that they provide the full braking torque. This means that, for example, the servomotors are now activated in such a way that they press the brake elements 7 against the brake discs with the required pressure to generate the curve jump of the curve K2. This minimal time offset is made possible due to the "pre-tensioning" or "preparation" of the friction braking device 4. It does not matter at what time within the times $t_{S2}$-$t_{S1}$ the regenerative brake fails, since within this time, as described, the friction braking device 4 is permanently "pre-tensioned" and can therefore take over the full regenerative operation at any time.

A further advantage is that, since the friction braking device is able to provide the full braking power at any time, the first threshold value S1 can also be set higher than in previously known systems. Linked to this, however, is better utilization of the regenerative potential of the regenerative brake, that is to say that significantly more current can be regenerated and fed back into the battery 3 than in previously known systems. At the same time, there is complete fallback safety in the event of a problem, since the friction braking device 4 is prepared at any time to instantaneously take over the complete braking operation.

Although FIG. 3 shows an example with a total failure of the regenerative brake, the system according to the disclosure is similarly usable in the event of a partial failure of the regenerative brake, thus when it can only provide a part of the actually required braking power for whatever reason. This is because due to the "pre-tensioning", the friction braking device 4 is also capable here at any time, from reaching the threshold value S2, of providing the missing braking power immediately and without delay.

The invention claimed is:

1. A motor vehicle, comprising:
an electric drive machine, which is configured to either drive the motor vehicle or brake the motor vehicle;
a friction braking device having multiple friction brakes, wherein each friction brake is assigned to a wheel of the motor vehicle and comprises brake elements and a brake disc, the brake elements are configured to move toward the brake disc via an actuator, wherein the electric drive machine is configured to drive the motor vehicle until a first threshold value based upon a ratio of regenerative power to friction braking power is reached, after which the friction braking device is configured to provide additional friction braking power, the friction braking device is configured to enter a pre-tensioning mode after the ratio of regenerative power to the friction braking power exceeds a second threshold value, and the second threshold value is less than the first threshold value.

2. The motor vehicle as claimed in claim 1, wherein the friction braking device has at least one control unit configured to control the friction brakes.

3. The motor vehicle as claimed in claim 2, wherein, when the second threshold value is reached, the brake elements are configured to move to reduce a distance between the brake elements and the brake disc.

4. The motor vehicle as claimed in claim 3, wherein a hydraulically operating friction braking device is provided with a brake fluid and the control unit is configured to increase the pressure of the brake fluid when the second threshold value is reached.

5. The motor vehicle as claimed in claim 3, wherein an electromechanical braking device having electrical actuating elements for moving the braking elements is provided and the control unit is configured to activate the actuating elements when the second threshold value is reached.

6. The motor vehicle as claimed in claim 3, wherein the second threshold value is between 10-40% of the maximum regenerative power.

7. The motor vehicle as claimed in claim 2, wherein, when the second threshold value is reached, the brake elements are configured to be brought into friction contact with the brake discs.

8. The motor vehicle as claimed in claim 3, wherein the second threshold value is between 0.1-0.4 g deceleration.

* * * * *